(12) United States Patent
Alden

(10) Patent No.: US 6,453,686 B1
(45) Date of Patent: Sep. 24, 2002

(54) DEEP CYCLE HEATING AND COOLING APPARATUS AND PROCESS

(76) Inventor: Ray M. Alden, 808 Lake Branden Trail, Raleigh, NC (US) 27610

( * ) Notice: Subject to any disclaimer, the term of this patent is extended or adjusted under 35 U.S.C. 154(b) by 0 days.

(21) Appl. No.: 09/964,146

(22) Filed: Sep. 25, 2001

(51) Int. Cl.$^7$ .............................. F25B 43/00; F25B 1/00
(52) U.S. Cl. ............................. 62/115; 62/509; 62/434; 62/529
(58) Field of Search ................................ 62/434, 324.4, 62/529, 498, 115, 120, 509

(56) References Cited

U.S. PATENT DOCUMENTS 1,718,530 A * 6/1929 Cook
2,803,952 A * 8/1957 Setzekorn et al.

* cited by examiner

Primary Examiner—Chen-Wen Jiang

(57) ABSTRACT

The present invention divides the traditional fill-loop heat pump compression (heating) and expansion (refrigeration) process into two separate half-loop processes. The two (half-loop) processes occur separately and are separated by physical distance and/or by time. The two processes are connected by either physical storage means and/or by pipeline means such that low pressure refrigerant and high pressure refrigerant are stored between cycles and/or transported between cycles. In operation, a refrigerant is compressed to provide heat to a location, the compressed refrigerant is then stored/transported to where/when a cooling process is needed whereupon the refrigerant is expanded to provide refrigeration, the expanded refrigerant is then stored/transported to where/when a heating process is needed. The result of this invention is a significant reduction in energy required to heat and cool buildings, a reduction in fossil fuel consumption (and concomitant carbon dioxide gas emission pollution), a reduction in thermal pollution (and concomitant global warming), and a reduction in the cost of heating and cooling buildings.

4 Claims, 12 Drawing Sheets

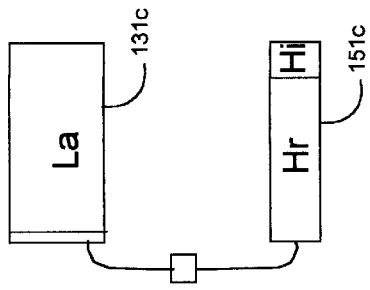
Figure 16a Winter
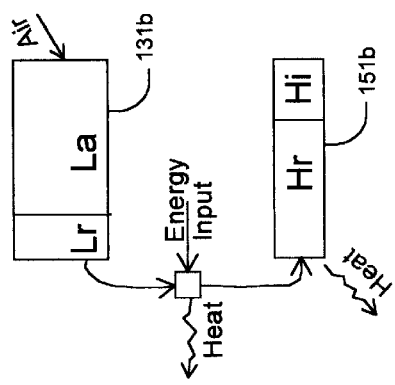
Figure 16b Winter
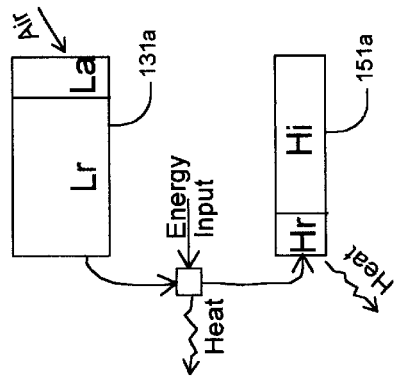
Figure 16c Winter Exhausted
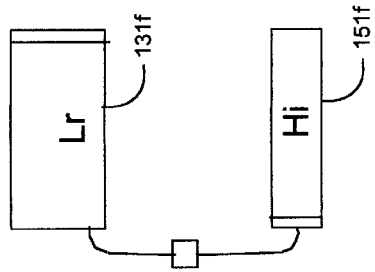
Figure 16d Summer
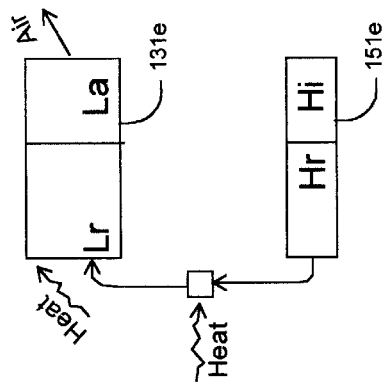
Figure 16e Summer
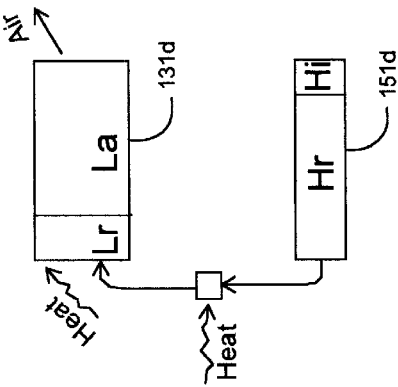
Figure 16f Summer Exhausted

DEEP CYCLE HEATING AND COOLING APPARATUS AND PROCESS

BACKGROUND FIELD OF INVENTION

Modem heating and cooling systems are widely used world wide to heat and cool buildings. Human endeavors are more comfortable and more productive in a temperature controlled environment. Nearly every home in the United States of America for example has either a heating unit such as a furnace or a cooling unit such as an air conditioner. Many homes have both heating and cooling units.

Heating of buildings particularly during the winter months requires much energy often in the form of fossil fuels. Likewise cooling of buildings, particularly in the summer requires much electricity which often is generated by burring fossil fuels. Because of the need for temperature control and the high energy consumption required, methods of heating and cooling that utilize less energy are desirable and have been widely sought.

The present invention provides a significant step forward for both heating and cooling. The present invention describes multiple embodiments which each split the traditional heat pump/refrigeration loop into two half loops. In a first embodiment, the first half loop operates a compressor in the winter to create heat by compressing a fluid. The compressed fluid is then stored. The second half of the loop operates in the summer by expanding the stored fluid to cool the building. The expanded fluid (low pressure fluid) is then stored for use in the ensuing winter. Thus one half of the traditional cycle heat pump cycle operates in the winter and the other half of the traditional heat pump cycle operates in the summer. Large fluid storage tanks are required to store high pressure fluid and low pressure fluid. In a second embodiment the first half loop is in cold regions. Low pressure fluids are compressed to form high pressure fluids, thereby releasing heat. The high pressure fluid is then transported to a hot region where the second half loop is performed. The high pressure fluid is expanded in the hot region, thereby absorbing heat, and becoming a low pressure fluid). The low pressure fluid then being transported back to the cold region to be used again. Tanks of the fluid can be transported between the hot region and cold region. Alternately, a pipeline is proposed to connect the hot region and the cold region. Both embodiments, conserve energy, resources, and reduce global warming.

BACKGROUND—DESCRIPTION OF PRIOR INVENTION

Prior art heat pumps use full loop compression cycles. Work is done on a fluid through a compressor which compresses the fluid. Heat from the compression is released into the building. The fluid is then evaporated where it absorbs heat from the cold environment. The fluid is rapidly and continuously cycled in a fill loop between the condenser and the evaporator.

Prior art air conditioners use full loop compression cycles. Work is done on a fluid through a compressor which compresses the fluid. Heat from the compression is released into the warm environment. The fluid is then evaporated where it absorbs heat from the building. The fluid is rapidly and continuously cycled in a fill loop between the condenser and the evaporator.

Note that in both the heat pump and in the air conditioner, work is done (electrical energy is required). Additionally, friction in the compressor is generally wasting heat in both the heat pump and the air conditioner. Moreover, heat is dumped into a warm environment in the summer and heat is drawn from a cold environment in the winter.

No prior art provides a technique to use the work done to create heat within a building to also absorb heat from a building at a later time and/or in a different location. The present art, stores the energy invested in the heating cycle to later be used in the cooling cycle. It effectively links building heating and building cooling into one deep cycle multi-stage process with enabling apparatus. When considering entropy, it is not possible to create a system which produces net coolness (in example, a "cooling" system actually dumps heat into the environment far in excess of what it removes from a building). The present art eliminates all of this excess heat produced in the prior art cooling systems. Many scientists are concerned about global warming, the present system eliminates the heat generated in prior art cooling systems. Moreover, energy is conserved since the cooling side of the deep cycle loop of the present invention does not require any energy input in contrast with prior art. Additionally, friction heat can be used more efficiently in the present invention compared to prior art.

BRIEF SUMMARY

The invention described herein represents a significant improvement in heating of buildings and in cooling of buildings. In a first deep cycle half loop process, a compressor and condenser operate to compress and extract heat from a fluid. Said heat and friction energy being released into a building to provide heat. The compressed fluid is then stored in a high pressure storage tank or pipe for use at a later time or different location. In a second deep cycle half loop process, the compressed fluid is decompressed or evaporated to absorb heat from a building, thereby cooling a building and creating a low pressure fluid. Said low pressure fluid being stored for later use. Note that no energy need be expended to cool the building in the second half loop. The apparatus can include a high pressure storage means and a low pressure storage means whereby fluid generally will flow either from high pressure to low pressure or vice versa for extended periods of time. When considering entropy, it is not possible to create a system which produces net coolness (in example, a prior art "cooling" system actually dumps heat into the environment far in excess of what it removes from a building). Many scientists are concerned about global warming, the present system eliminates the heat generation common in prior art cooling systems. Moreover, it conserves energy since the cooling side of the full deep cycle loop of the present invention does not require any energy input in contrast with cooling systems of prior art. Additionally, friction heat can be used more efficiently in the present invention compared to prior art.

OBJECTS AND ADVANTAGES

Accordingly, several objects and advantages of my invention are apparent. It is an object of the present invention to provide a heating process and apparatus which can be used in cold climate locations and seasons. Said process and apparatus requires electrical energy input to compress a fluid and extract heat from said fluid compression process. It is an advantage of the present system that said compressed fluid is stored in a high pressure storage tank or pipe for use at a different time or location. It is a further advantage that friction from said compression process also heats the said building. It is an object of the present invention to provide a means for cooling a building. It is an advantage of the present invention to use the above compressed fluid to absorb heat from a building at a subsequent time or at a different location. It is an object of the present invention to conserve energy by creating a building cooling system which requires no energy input to compress fluid but instead uses fluid which was compressed as part of a heating cycle. It is an object of the present invention to eliminate significant heat energy from being dumped into the environment by cooling without a compressor operating solely for that purpose but instead using fluid which was used as part of a heating cycle. It is an advantage of the present system to eliminate and friction heat from the cooling process. It is an advantage of the present invention to provide a means to transport high pressure fluid from cold regions where it released heat. Said high pressure fluid being brought to a lower pressure in a hot region, thereby absorbing heat with no direct energy cost (except that of transport and containment). It is an advantage of the present invention to provide a means to transport low pressure fluid from hot regions where it absorbed heat. Said low pressure fluid being compressed to a higher pressure in a cold region, thereby releasing heat.

Further objects and advantages will become apparent from the enclosed figures and specifications.

DRAWING FIGURES

FIG. 1 prior art illustrates a heat pump cycle flowchart.

FIG. 2 prior art illustrates a refrigeration (cooling) cycle flowchart.

FIG. 3 prior art shows the full loop used for both cooling and for heating a building.

Figure is a map of regions of North American with two fluid pipelines serving the east coast.

Figure 11:
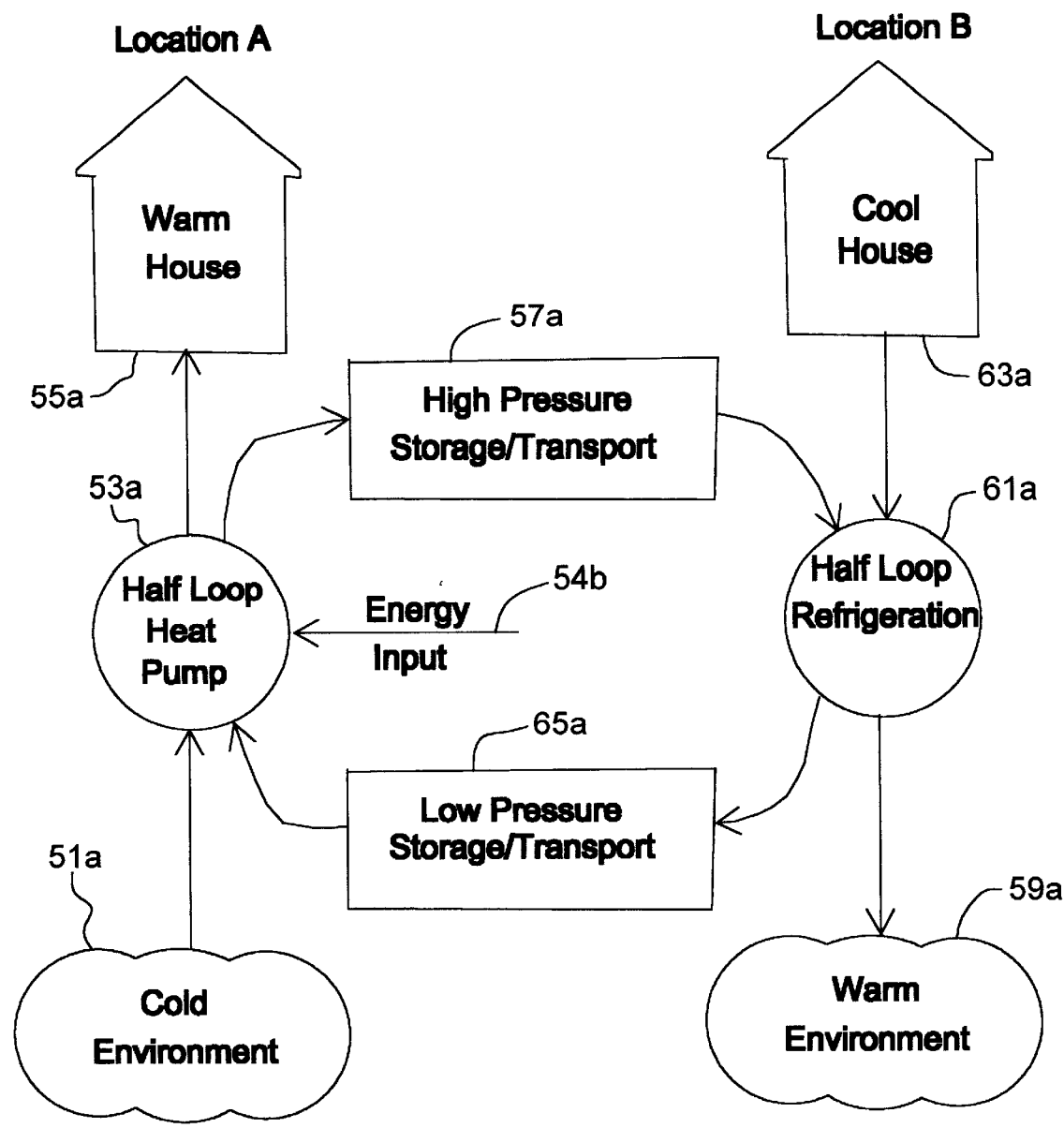

FIG. 11 illustrates a deep cycle full loop flowchart of the present invention for heating a first building and then cooling a second building.

Figure 12:
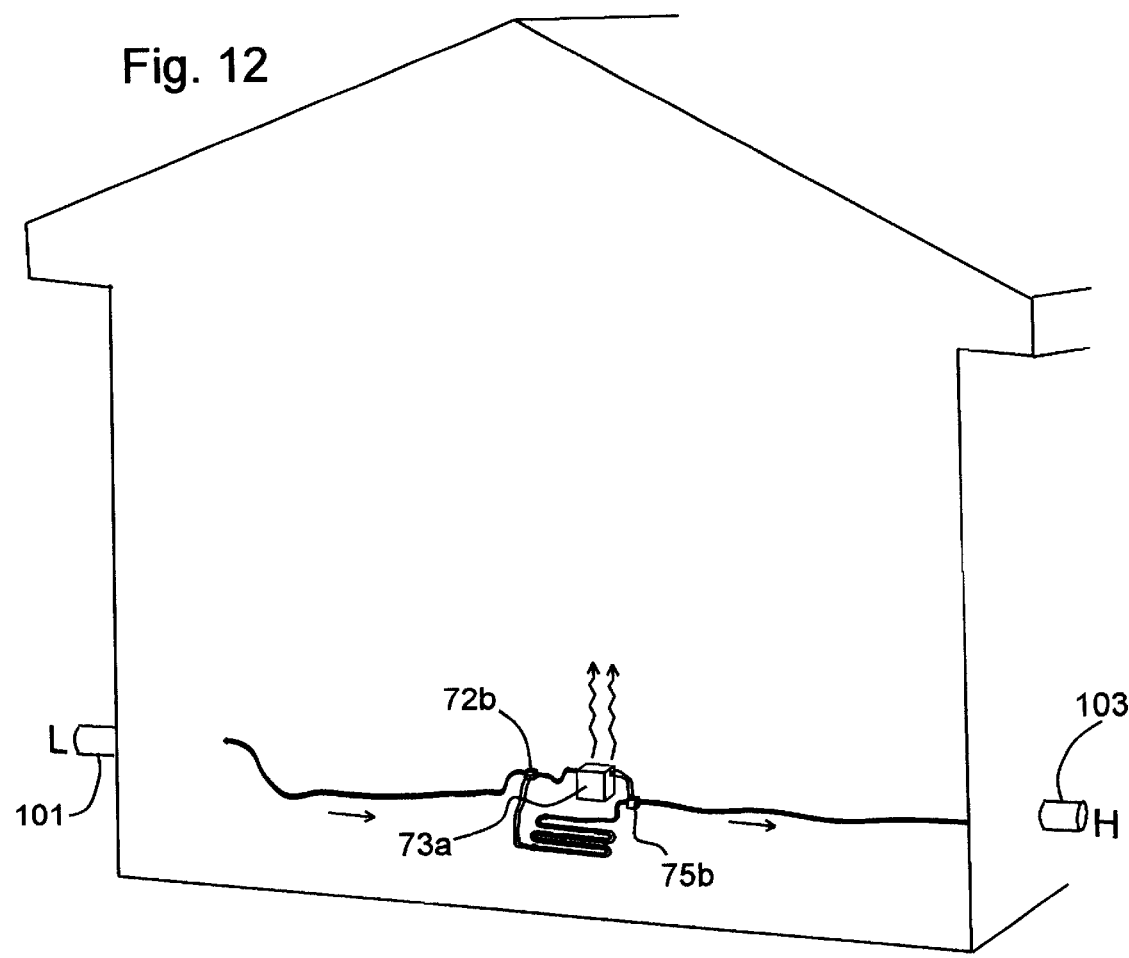

FIG. 12 shows the components of the present invention in the heating mode of the second embodiment.

Figure 13:
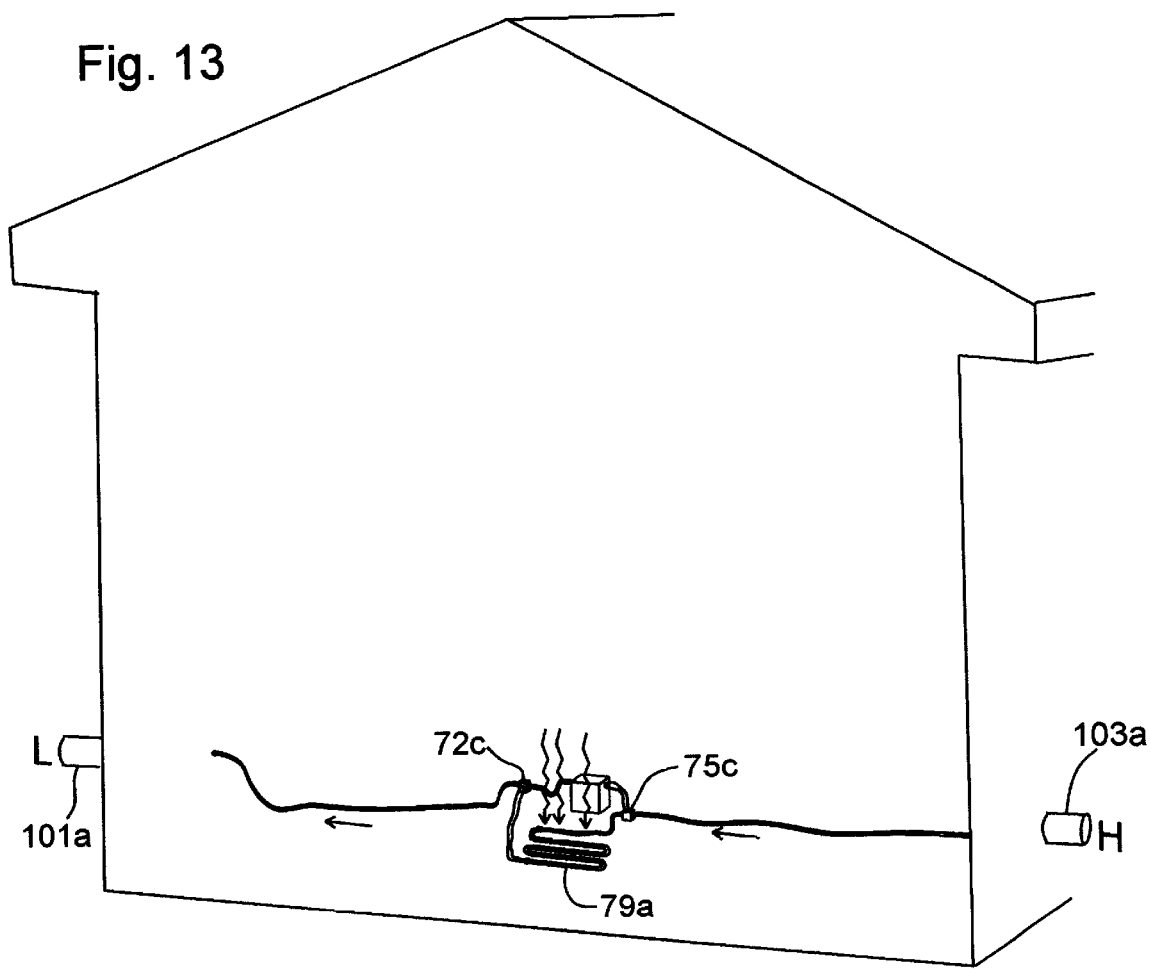

FIG. 13 shows the components of the present invention in the cooling mode of the second embodiment.

Figure 14:
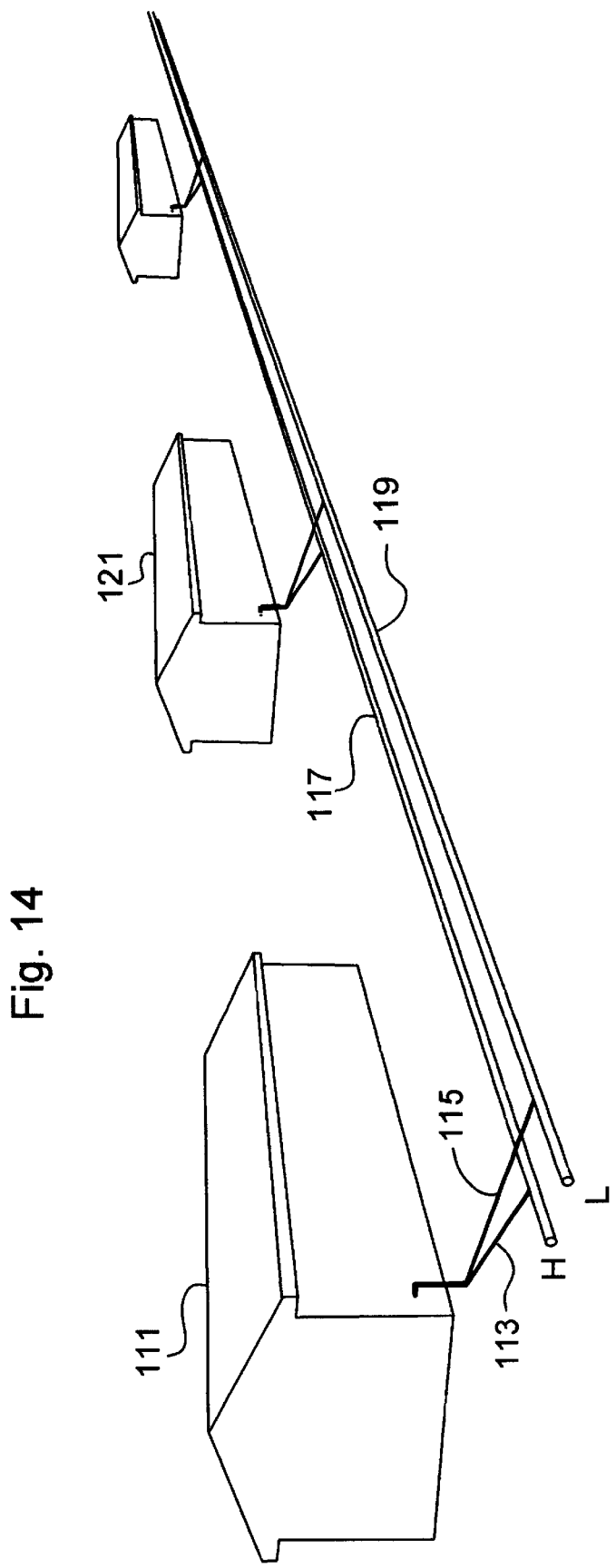

FIG. 14 shows a series of houses each connected to a high pressure fluid pipeline and to a low pressure fluid pipeline.

Figure 5:
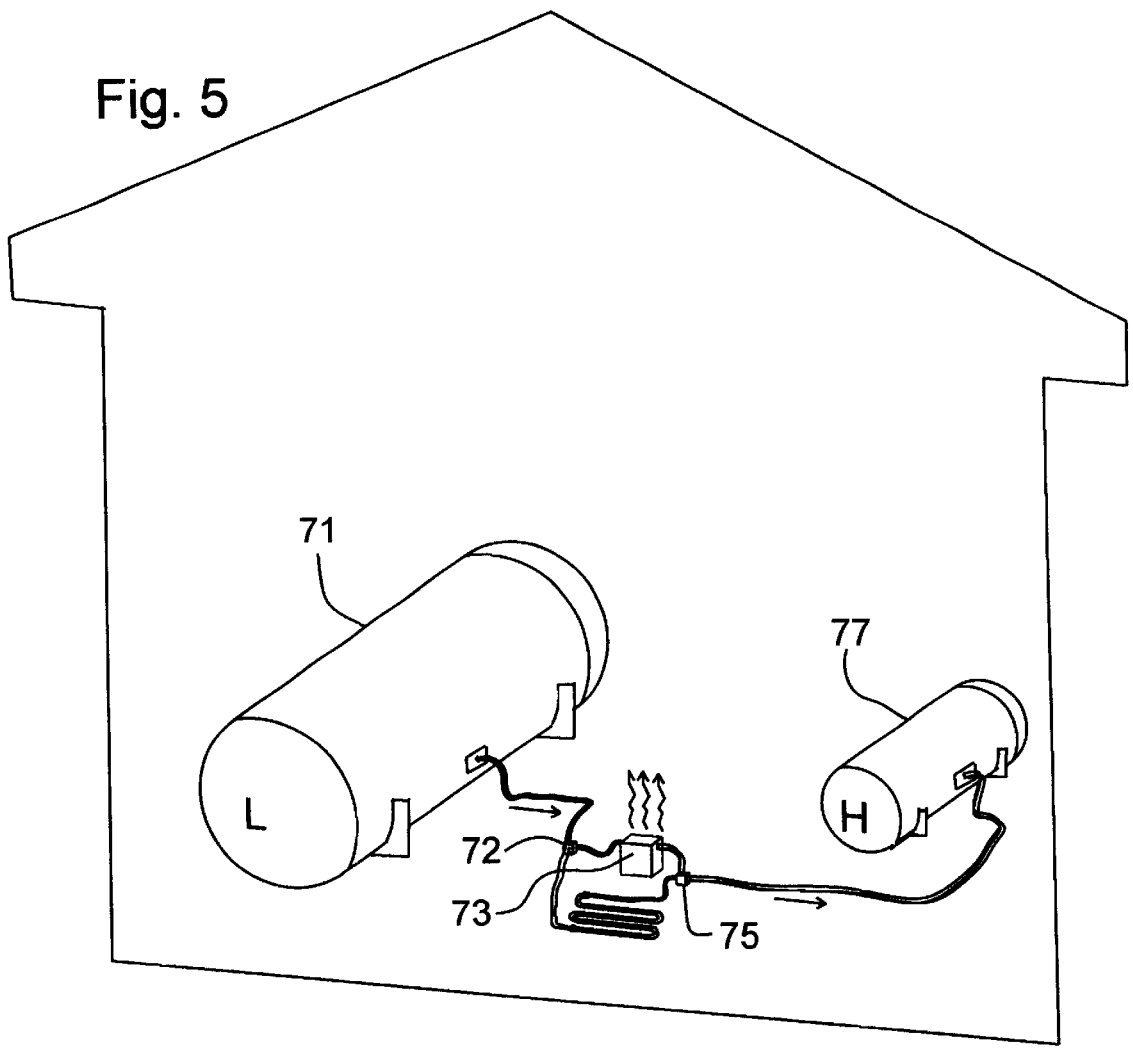
FIG. 5 shows the components of the present invention in the heating mode of the first embodiment.
Figure 6:
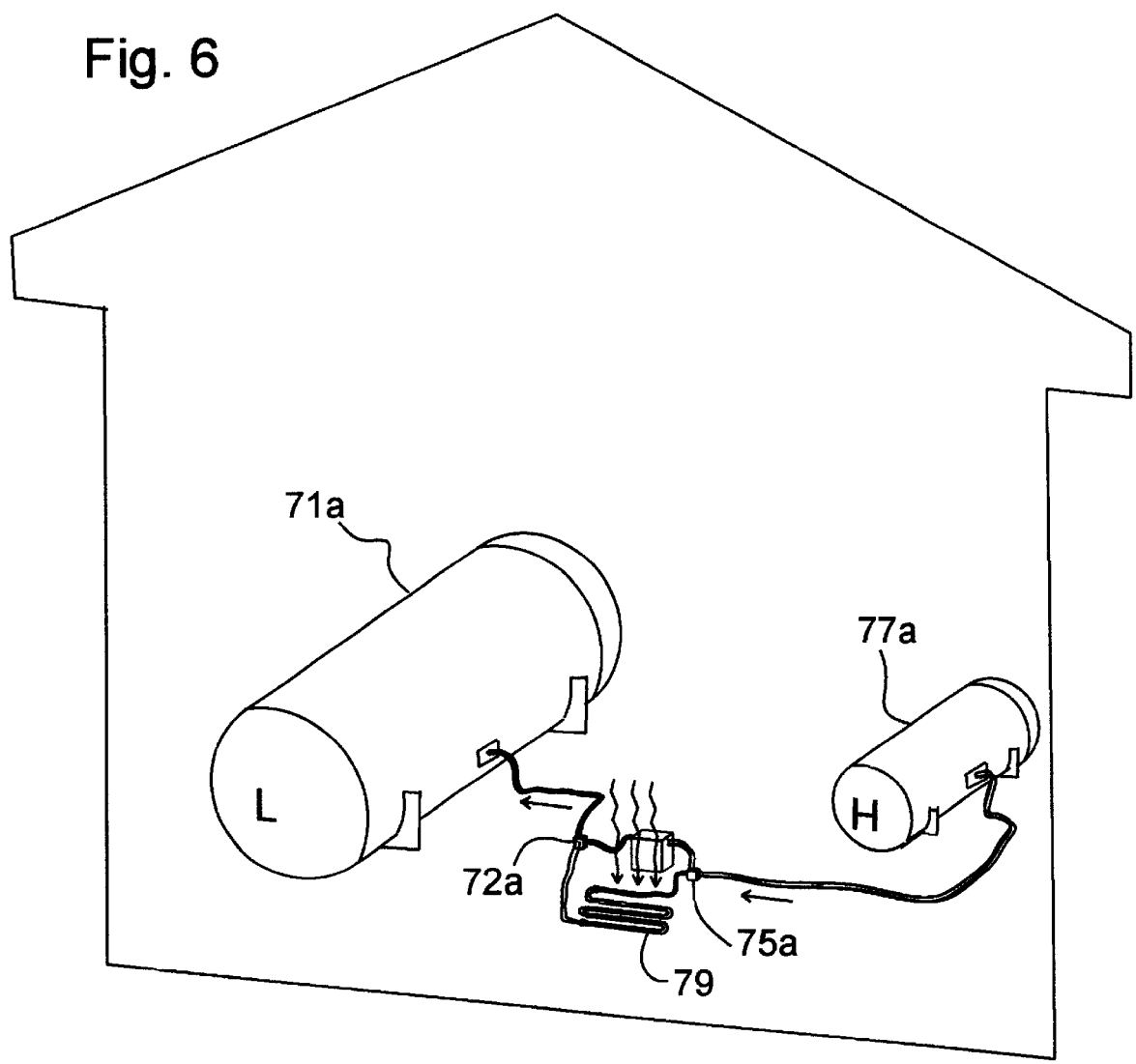
FIG. 6 shows the components of the present invention in the cooling mode of the first embodiment.
Figure 15:
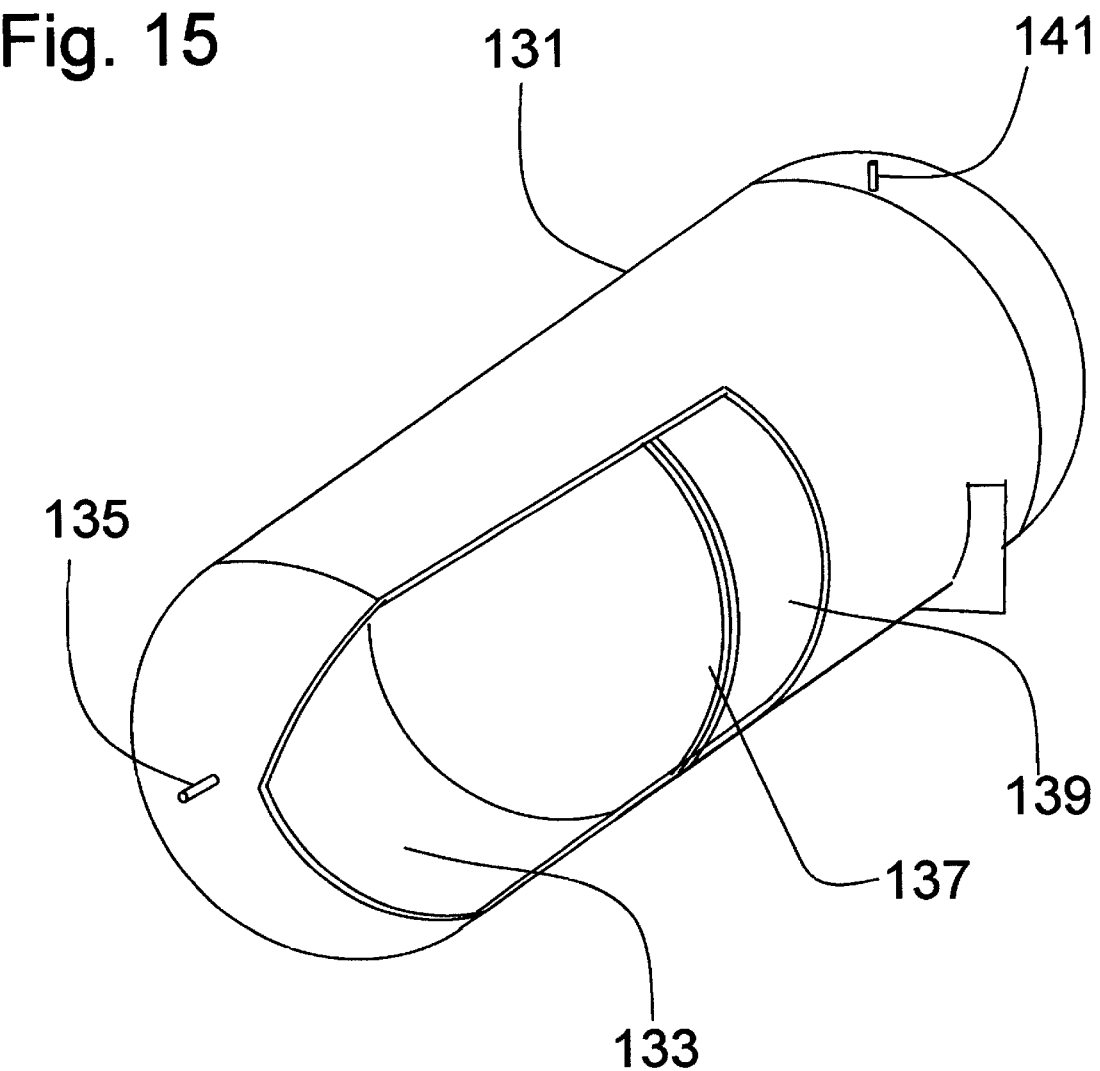

FIG. 15 shows the storage tanks of FIG. 5 and FIG. 6 in cutaway view.

FIG. 16a shows a cross section view of two 131 tank of FIG. 15 they are 131a and 151a.

FIG. 16b shows a cross section view of two 131 tank of FIG. 15 they are 131b and 151b.

FIG. 16c shows a cross section view of two 131 tank of FIG. 15 they are 131c and 151c.

FIG. 16d shows a cross section view of two 131 tank of FIG. 15 they are 131d and 151d.

FIG. 16e shows a cross section view of two 131 tank of FIG. 15 they are 131e and 151e.

FIG. 16f shows a cross section view of two 131 tank of FIG. 15 they are 131f and 151f.

DETAILED DESCRIPTION OF THE INVENTION

Figure 1:
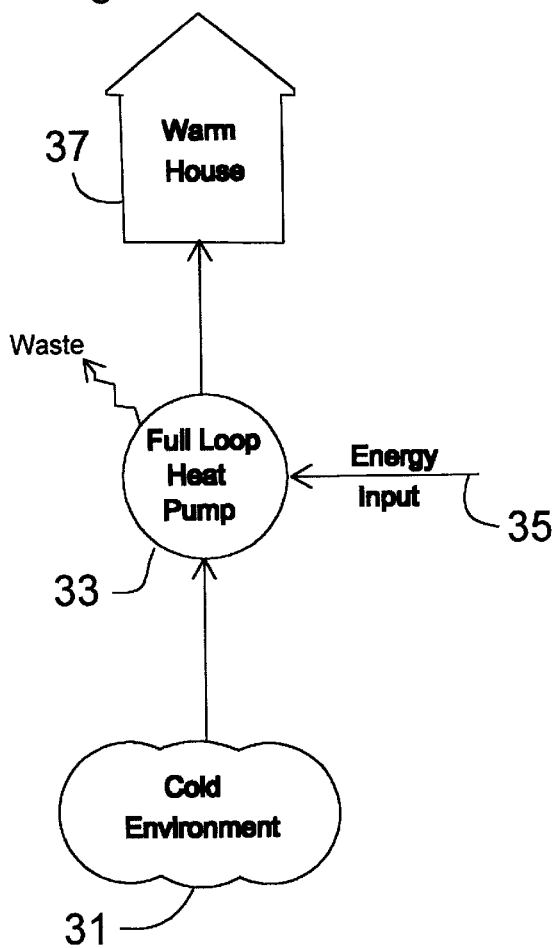

FIG. 1 prior art illustrates a heat pump cycle flowchart. A full loop heat pump 33 constantly cycles fluid from a low pressure to a high pressure and back to a low pressure again. The energy released from the compressing of the fluid from low pressure to a high pressure is transferred into a warm house 37. This process requires an energy input 35. The compressed fluid is then expanded in a cold environment 31 to absorb heat. Absorbing heat from a cold environment is not efficient.

Figure 2:
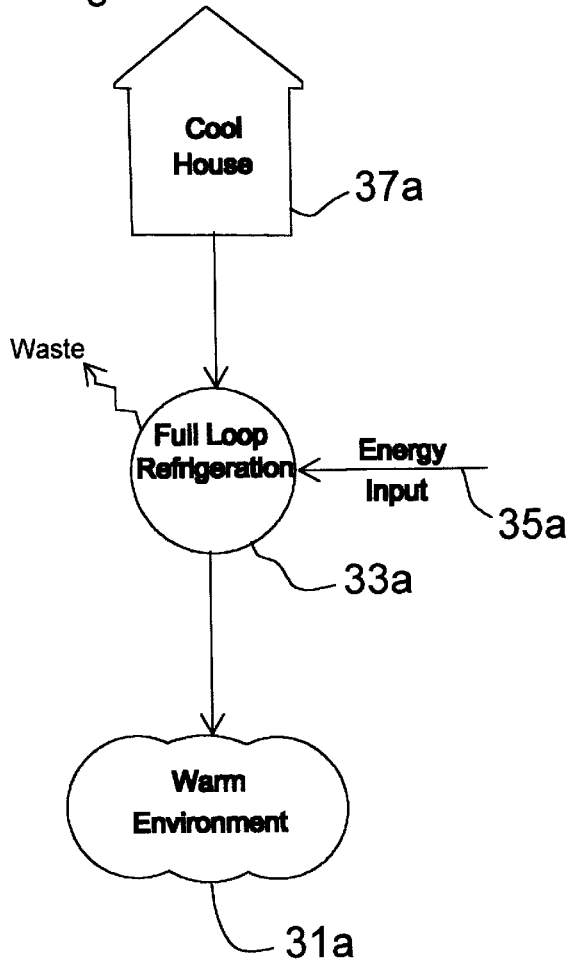

FIG. 2 prior art illustrates a refrigeration (cooling) cycle flowchart. A full loop air conditioner 33a (which can be structurally identical to the 33) constantly cycles fluid from a high pressure to a low pressure and back to a high pressure again. The energy absorbed from the expansion of the fluid from high pressure to a low pressure is withdrawn from a cool house 37a. This process requires an energy input 35a. The expanded fluid is then compressed in a warm environment 31a to release heat. Releasing heat into a warm environment is not efficient and may contribute to global warming.

Figure 3:
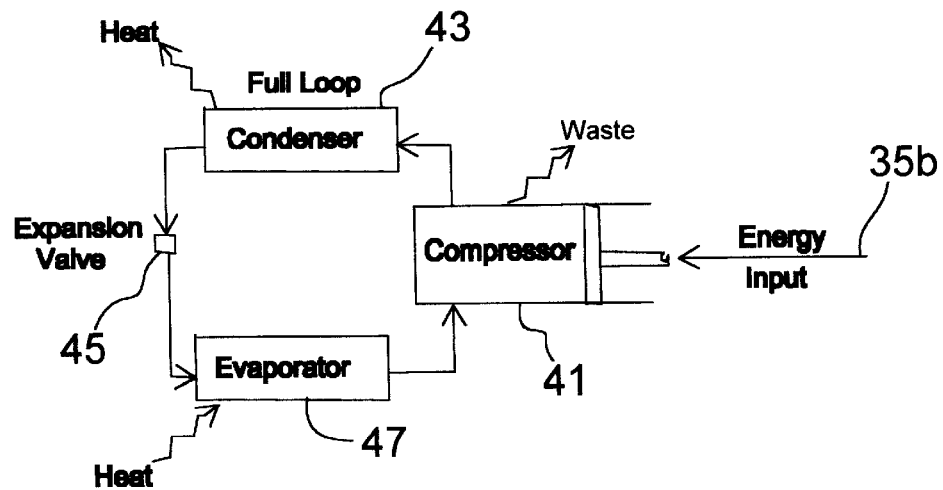

FIG. 3 prior art shows the full loop used for both cooling and for heating a building. This describes the elements and cycle of both FIG. 1 and of FIG. 2. An energy input 35b operates a compressor 41, The compressor gives off waste heat caused by friction. Fluid moves from the compressor through a condenser where heat is heat released. Said heat is released into the warm environment when being used to cool, said heat is released into the house when being used to heat. Fluid then flows through an expansion valve 45 which enables the fluid to expand within an evaporator 47 said expansion absorbing heat. When in the heating mode, the heat is absorbed from a cold environment, and when in the cooling mode the heat is absorbed from within the house.

Note that when operating as a heater, the prior art system requires energy input and when operating as a cooler, the prior art requires energy input. Moreover, heat is inefficiently dumped into a warm environment, and heat is inefficiently absorbed from a cold environment. The prior art, using the fill loop cycles for both heating and for cooling, is both an inefficient heater and an inefficient cooler.

Figure 4:
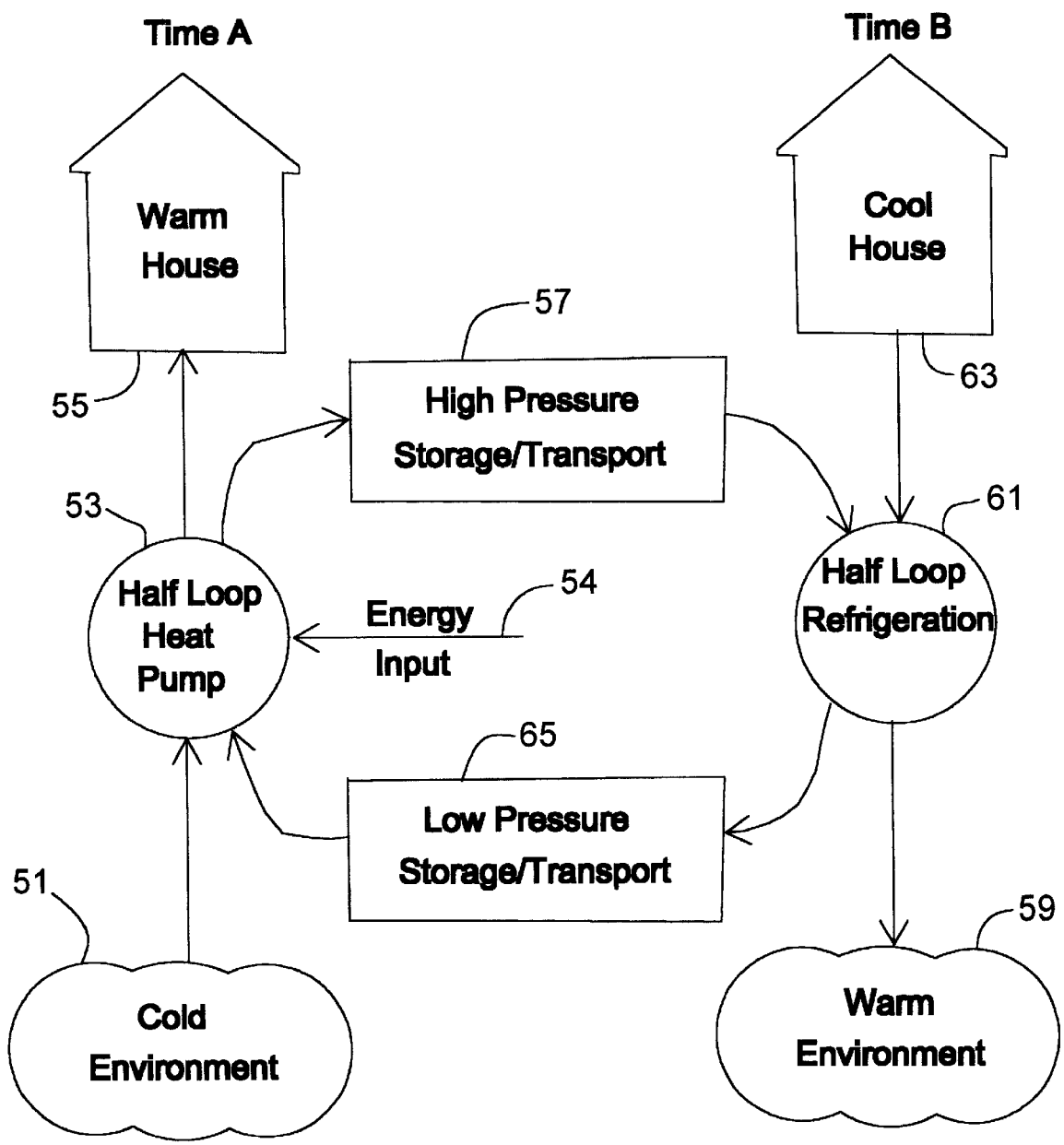
FIG. 4 illustrates a deep cycle full loop flowchart of the present invention for first heat and then cooling a building.

FIG. 4 illustrates a deep cycle full loop flowchart of the present invention for first heating and then cooling a building. At a first time "A" (during the winter), a half loop heat pump 53 operates by drawing a low pressure fluid from a low pressure storage means 65. Time "A" energy 54 is input to compress said low pressure fluid. Said compression causes heat energy to be released into a time "A" warm house 55. Said fluid, once compressed and heat extracted, is stored in a high pressure storage means 57. Note that during time "A", the fluid is not returned to the low pressure state. A deep cycle system by definition will operate on only half of the prior art refrigeration loop at a time such that in the winter, only the compression side of the loop operates to release heat for warmth. Note that no heat is drawn from the time "A" cold environment.

At a second time "B" (during the summer), a half loop air conditioner 61 operates by drawing the high pressure fluid from the high pressure storage means 57. No energy input is required to expand said high pressure fluid. Said expansion causes heat energy to be absorbed from a time "B" cool house 63. Said fluid, once expanded and heat absorbed, is stored in the low pressure storage means 65. Note that during time "B", the fluid is not returned to the high pressure state. A deep cycle system by definition will operate on only half of the prior art refrigeration loop at a time such that in the summer, only the expansion side of the loop operates to absorb heat for cooling. Note that no heat is released into the time "B" warm environment. Moreover no energy need be input during the time "B" cooling process. Further, no friction heat loss is incurred in this cooling process. I should be noted that 55 and 63 are the same house at different times of the year.

FIG. 5 shows the components of the present invention in the heating mode of the first embodiment. When operating in the heating mode, a large low pressure storage tank 71 contains a fluid. Said fluid is drawn through a compressor/condenser 73 where it releases heat energy into the house. Said fluid having passed through a low pressure valve 72. Note that any friction energy is also released into the house since the 73 is in the house. High pressure fluid then flows through a high pressure valve 75 and into a large high pressure storage tank 77. Note that in the heating cycle, the fluid only flows in one direction, from low pressure to high pressure. The system will operate in this manner all winter. If the storage tanks are not adequate to store enough fluid to last the whole winter, they will be periodically changed with new tanks. Specifically, a new 71 tank will come filled with low pressure fluid and a new tank 77 will come empty (tanks are prepared according to FIGS. 15 and 16).

FIG. 6 shows the components of the present invention in the cooling mode of the first embodiment. When operating in the cooling mode, a large high pressure storage tank 77a contains a fluid. Said fluid is pushed by its own pressure through an evaporator 79 where it absorbs heat energy from the house. Said fluid having passed through a pressure valve 75a. Note that no friction heat energy is released since no work need be done. Low pressure fluid then flows through a second pressure valve 72a and into a large low pressure storage tank 71a. Note that in the cooling cycle, the fluid only flows in one direction, from high pressure to low pressure. The system will operate in this manner all summer. If the storage tanks are not adequate to store enough fluid to last the whole summer, they will be periodically changed with new tanks. Specifically, a new 77a tank will come filled with high pressure fluid and a new tank 71a will come empty (tanks are prepared according to FIGS. 15 and 16).

Figure 7:
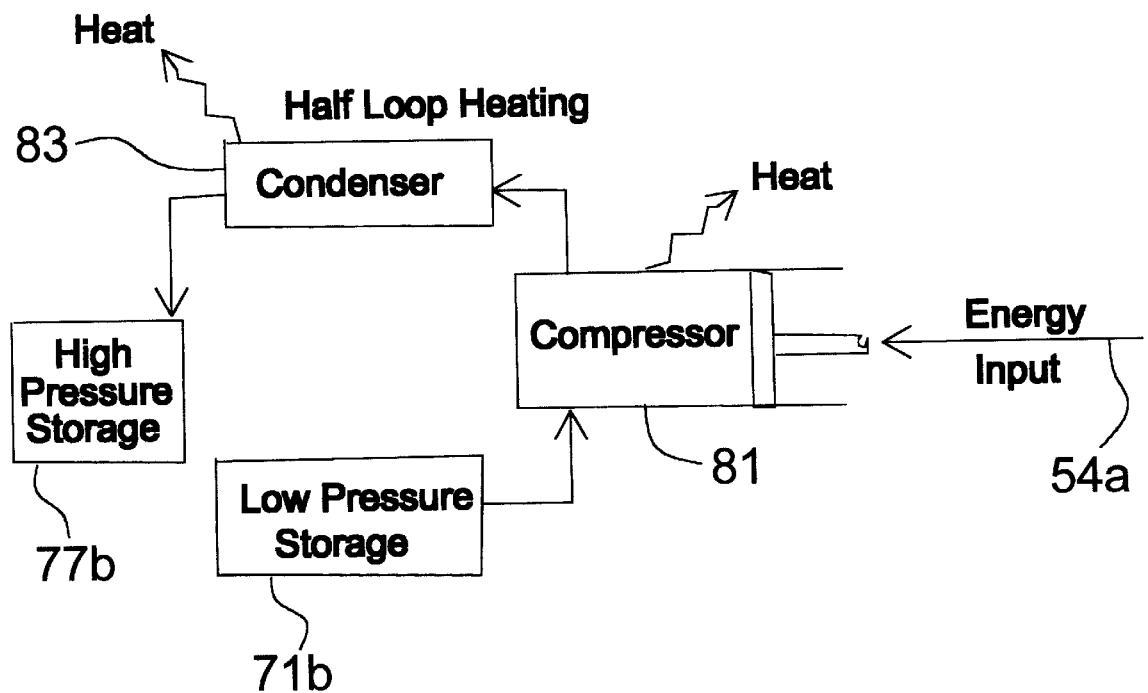
FIG. 7 is a flowchart of a deep cycle heating half loop of the present invention.

FIG. 7 is a flowchart of a deep cycle heating half loop of the present invention describing the process of FIG. 5. A low pressure storage tank 71a contains a fluid which is drawn through a fluid compressor 81 and then pushed through a condenser. Heat is released in the compression/condenser cycle. Energy must be input into the compressor as input energy 54a. After passing through the condenser, high pressure fluid is stored in the high pressure storage tank 77b. This is a half loop deep cycle system since when in the heating mode, it flows in only one direction.

Figure 8:
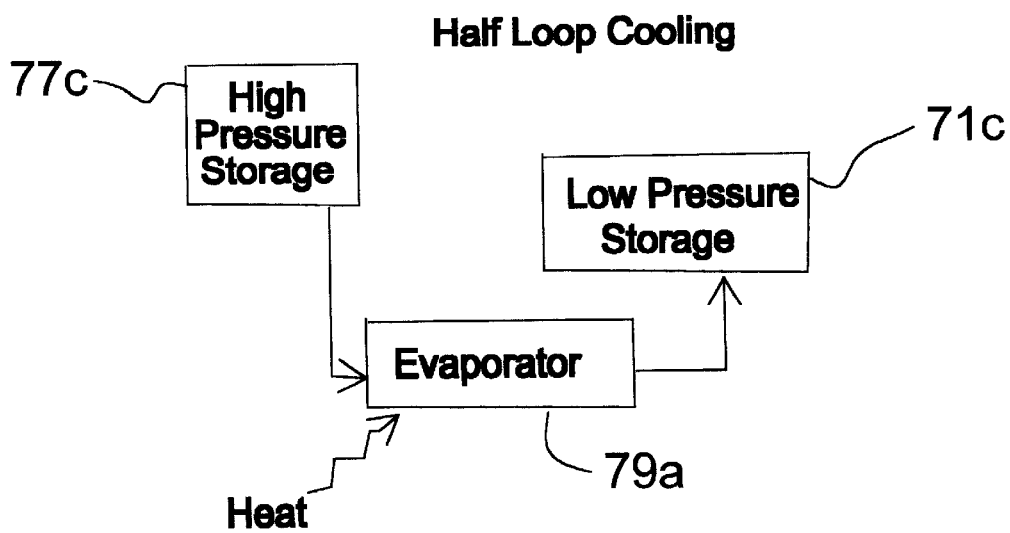
FIG. 8 is a flowchart of a deep cycle cooling half loop of the present invention.

FIG. 8 is a flowchart of a deep cycle cooling half loop of the present invention it describes the stem of FIG. 6. High pressure fluid is stored in high pressure storage tank 77c. IT flows through an evaporator 79a where it absorbs heat. Note that no energy input is required for this cooling process and no friction heat is generated. The fluid is then stored in a low pressure storage tank 71c. This is a half loop deep cycle system since when in the cooling mode, it flows in only one direction.

Figure 9:
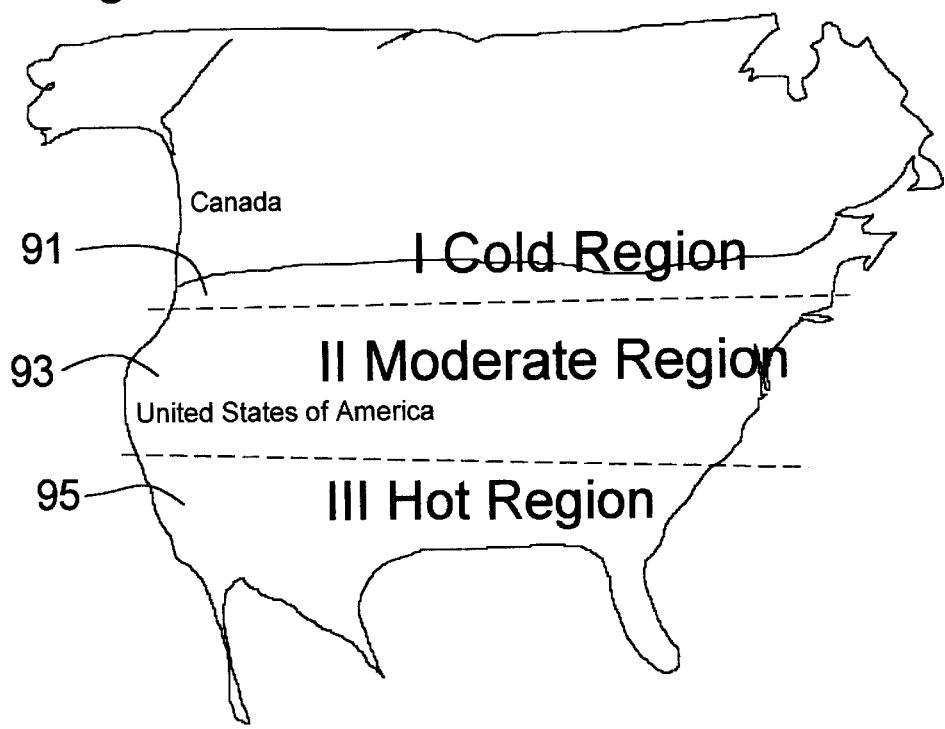
FIG. 9 is a map of regions of North American segmented by annual temperature patterns.

FIG. 9 is a map of regions of North American segmented by annual temperature patterns. North America can be divided into three regions. A cold region I 91 where heating is required much of the time and cooling is generally not required. A moderate region II 93 where heating is required in the winter and cooling is required in the summer. A hot region III where heating is generally not required and where cooling is required much of the time.

Figure 10:
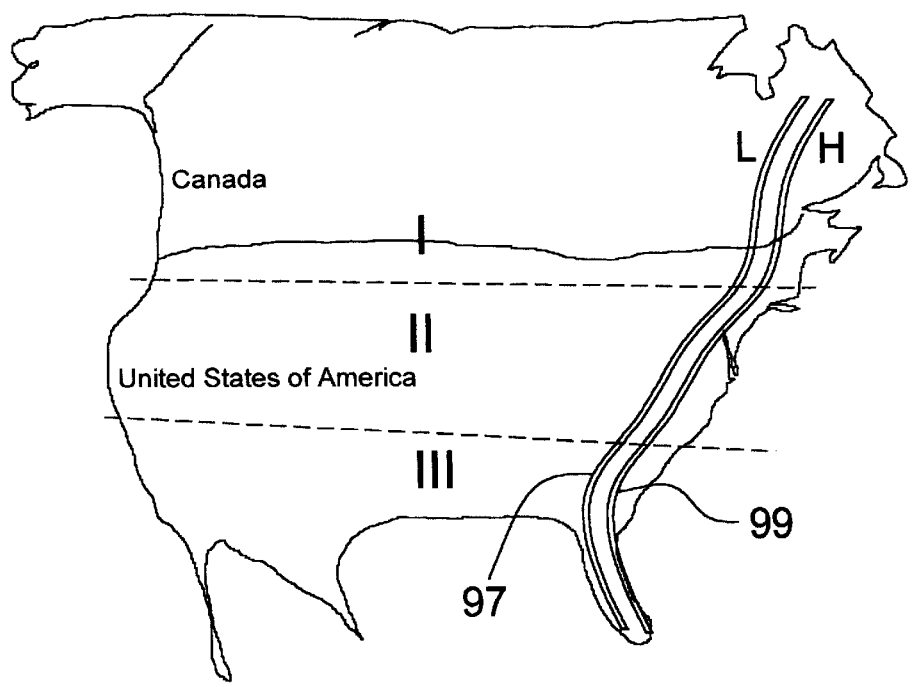

FIG. 10 is a map of regions of North American with two fluid pipelines serving the east coast. A low pressure pipeline 97 contains a fluid under low pressure and stretches across three zones of North America. A high pressure pipeline 99 contains a fluid under high pressure and stretches across three zones of North America. Pressures in these pipelines are respectively kept within a normal operating pressure range according to passive techniques described in FIGS. 15 and 16 and other active techniques which are well know in the prior art. This dual pipeline technique enables users of building heating in region I to generate heat using the afore described half loop deep cycle technique while users of building cooling in region III absorb heat using the afore described half loop deep cycle technique. This system integrates a vast number of heaters and coolers to create a totally new utility that significantly reduces energy consumption and global warming.

FIG. 11 illustrates a deep cycle full loop flowchart of the present invention for heating a first building in Region I of FIG. 10 and then cooling a second building in region II of FIG. 10 (wherein both buildings are connect to 97, and 99). At a first location "A" (in a cold region), a half loop heat pump 53a operates by drawing a low pressure fluid from a low pressure storage means 65a. Location "A" energy 54a is input to compress said low pressure fluid. Said compression causes heat energy to be released into a location "A" warm house 55a. Said fluid, once compressed and heat extracted, is stored in a high pressure storage means 57a. Note that at location "A", the fluid is not returned to the low pressure state. A deep cycle system by definition will operate on only half of the prior art refrigeration loop at a time such that in the cold region, only the compression side of the loop operates to release heat for warmth. Note that no heat is drawn from the location "A" cold environment.

At a second location "B" (in a warm region), a half loop air conditioner 61a operates by drawing the high pressure fluid from the high pressure storage means 57a. No energy input is required to expand said high pressure fluid. Said expansion causes heat energy to be absorbed from a location "B" cool house 63a. Said fluid, once expanded and heat absorbed, is stored in the low pressure storage means 65a. Note that at location "B", the fluid is not returned to the high pressure state. A deep cycle system by definition will operate on only half of the prior art refrigeration loop at a time such that in the warm region, only the expansion side of the loop operates to absorb heat for cooling. Note that no heat is released into the location "B" warm environment. Moreover no energy need be input during the location "B" cooling process. Further, no friction heat loss is incurred in this cooling process. It should be noted that 55a and 63a are in different regions as illustrated in FIG. 10.

FIG. 12 shows the components of the present invention in the heating mode of the second embodiment. When operating in the heating mode, a low pressure storage pipe 101 contains a fluid and is connected to the house. Said pipe is connected to 97 of FIG. 10. Said fluid is drawn through a compressor/condenser 73a where it releases heat energy into the house. Said fluid having passed through a low pressure valve 72b. Note that any friction energy is also released into the house since the 73a is in the house. High pressure fluid then flows through a high pressure valve 75b and into a large high pressure storage pipe 103. Said pipe is connected to 99 of FIG. 10. Note that in the heating cycle, the fluid only flows in one direction, from low pressure to high pressure. The system will operate in this manner all winter.

FIG. 13 shows the components of the present invention in the cooling mode of the second embodiment. When operating in the cooling mode, a high pressure storage pipe 103a contains a fluid. Said pipe is connected to 99 of FIG. 10. Said fluid is pushed by its own pressure through an evaporator 79a where it absorbs heat energy from the house. Said fluid having passed through a pressure valve 75c. Note that no friction heat energy is released since no work need be done. Low pressure fluid then flows through a second pressure valve 72c and into a low pressure storage pipe 101a. Note that in the cooling cycle, the fluid only flows in one direction, from high pressure to low pressure. The system will operate in this manner all summer. Said pipe is connected to 97 of FIG. 10.

FIG. 14 shows a series of houses each connected to a high pressure fluid pipeline and to a low pressure fluid pipeline. Note that high pressure spur 117 is a spur off of 99 of FIG. 10 and low pressure spur 119 is a spur off of 97 of FIG. 10. A first house 111 is connected to the 117 via a first connecting pipe 113 and the 119 via a second connecting pipe 115. The 113 connects to 103 and 103a of FIGS. 12 and 13 respectively while the 115 connects to the 101 and 101a of FIGS. 12 and 13 respectively. A second house 121 is similarly connected to 117 and 119 as are a series of houses throughout regions I, II, and III of FIG. 10.

FIG. 15 shows the storage tanks of FIG. 5 and FIG. 6 in cutaway view. A cutaway storage tank 131 is a solid metal sealed container. A floating piston 137 sealably forms two chambers within the 131. A first chamber 133 contains a fluid which is used as a refrigerant. A second chamber 139 is used to contain a second gas which is further described in FIG. 16. The 137 floats back an forth within the tank such that the 133 and 139 are variable in volume. A refrigerant port enables refrigerant to be drawn from or pushed into the 133 as needed. An air vent 141 is used only on the low pressure tanks. It enables air to flow into and out of the 139 such that a relatively constant pressure is maintained in the 133 as the volume of 133 changes.

FIG. 16a shows a cross section view of a low pressure and a high pressure tank similar to 131 tanks of FIG. 15 they are 131a and 151a. A compressor draws fluid from a low pressure "a" low tank 131a to compress it, produce heat and store it in a high pressure "a" high tank 151a. This creates a negative pressure differential in 131a such that the floating piston moves to the left and causes air to enter a sealed compartment of the tank. Further, a pressure differential is created within the 151a which causes Hr to push against the 151a floating piston and thereby compresses a compressible inert gas Hi. As this process continues through the winter, The Lr (low pressure refrigerant volume is reduced and its volume displaced with air La, also the High pressure refrigerant Hr increases causing the Hi inert gas to further compress. Thus a desired pressure range is maintained in both 131a and 151a while the volume of gas moves from the former to the later. FIG. 16b shows the process further along. FIG. 16c shows the process complete. When the summer comes, FIG. 16d describes the cooling process. The pressure within the Hr enables its controlled release from the high pressure "d" high tank 151d into the low pressure "d" tank 131d. Hi increases volume in the former while La is expelled from the later. Thus pressure in both the 151a and the 131a are maintained within a desirable range while relative refrigerant volume change in both 151d and 131d. Note that no energy input is required for the summer cooling operation. Compressible gasses such as Hi can also be used to passively regulate the pressure in the pipeline system of FIG. 10.

Operation of the Invention

FIG. 1 prior art illustrates a heat pump cycle flowchart. A full loop heat pump 33 constantly cycles fluid from a low pressure to a high pressure and back to a low pressure again. The energy released from the compressing of the fluid from low pressure to a high pressure is transferred into a warm house 37. This process requires an energy input 35. The compressed fluid is then expanded in a cold environment 31 to absorb heat. Absorbing heat from a cold environment is not efficient.

FIG. 2 prior art illustrates a refrigeration (cooling) cycle flowchart. A full loop air conditioner 33a (which can be structurally identical to the 33) constantly cycles fluid from a high pressure to a low pressure and back to a high pressure again. The energy absorbed from the expansion of the fluid from high pressure to a low pressure is withdrawn from a cool house 37a. This process requires an energy input 35a. The expanded fluid is then compressed in a warm environment 31a to release heat. Releasing heat into a warm environment is not efficient and may contribute to global warming.

FIG. 3 prior art shows the full loop used for both cooling and for heating a building. This describes the elements and cycle of both FIG. 1 and of FIG. 2. An energy input 35b operates a compressor 41, The compressor gives off waste heat caused by friction. Fluid moves from the compressor through a condenser where heat is heat released. Said heat is released into the warm environment when being used to cool, said heat is released into the house when being used to heat. Fluid then flows through an expansion valve 45 which enables the fluid to expand within an evaporator 47 said expansion absorbing heat. When in the heating mode, the heat is absorbed from a cold environment, and when in the cooling mode the heat is absorbed from within the house.

Note that when operating as a heater, the prior art system requires energy input and when operating as a cooler, the prior art requires energy input. Moreover, heat is inefficiently dumped into a warm environment, and heat is inefficiently absorbed from a cold environment. The prior art, using the fill loop cycles for both heating and for cooling, is both an inefficient heater and an inefficient cooler.

FIG. 4 illustrates a deep cycle full loop flowchart of the present invention for first heating and then cooling a building. At a first time "A" (during the winter), a half loop heat pump 53 operates by drawing a low pressure fluid from a low pressure storage means 65. Time "A" energy 54 is input to compress said low pressure fluid. Said compression causes heat energy to be released into a time "A" warm house 55. Said fluid, once compressed and heat extracted, is stored in a high pressure storage means 57. Note that during time "A", the fluid is not returned to the low pressure state. A deep cycle system by definition will operate on only half of the prior art refrigeration loop at a time such that in the winter, only the compression side of the loop operates to release heat for warmth. Note that no heat is drawn from the time "A" cold environment.

At a second time "B" (during the summer), a half loop air conditioner 61 operates by drawing the high pressure fluid from the high pressure storage means 57. No energy input is required to expand said high pressure fluid. Said expansion causes heat energy to be absorbed from a time "B" cool house 63. Said fluid, once expanded and heat absorbed, is stored in the low pressure storage means 65. Note that during time "B", the fluid is not returned to the high pressure state. A deep cycle system by definition will operate on only half of the prior art refrigeration loop at a time such that in the summer, only the expansion side of the loop operates to absorb heat for cooling. Note that no heat is released into the time "B" warm environment. Moreover no energy need be input during the time "B" cooling process. Further, no friction heat loss is incurred in this cooling process. I should be noted that 55 and 63 are the same house at different times of the year.

FIG. 5 shows the components of the present invention in the heating mode of the first embodiment. When operating in the heating mode, a large low pressure storage tank 71 contains a fluid. Said fluid is drawn through a compressor/condenser 73 where it releases heat energy into the house. Said fluid having passed through a low pressure valve 72. Note that any friction energy is also released into the house since the 73 is in the house. High pressure fluid then flows through a high pressure valve 75 and into a large high pressure storage tank 77. Note that in the heating cycle, the fluid only flows in one direction, from low pressure to high pressure. The system will operate in this manner all winter. If the storage tanks are not adequate to store enough fluid to last the whole winter, they will be periodically changed with new tanks. Specifically, a new 71 tank will come filled with low pressure fluid and a new tank 77 will come empty (tanks are prepared according to FIGS. 15 and 16).

FIG. 6 shows the components of the present invention in the cooling mode of the first embodiment. When operating in the cooling mode, a large high pressure storage tank 77a contains a fluid. Said fluid is pushed by its own pressure through an evaporator 79 where it absorbs heat energy from the house. Said fluid having passed through a pressure valve 75a. Note that no friction heat energy is released since no work need be done. Low pressure fluid then flows through a second pressure valve 72a and into a large low pressure storage tank 71a. Note that in the cooling cycle, the fluid only flows in one direction, from high pressure to low pressure. The system will operate in this manner all summer. If the storage tanks are not adequate to store enough fluid to last the whole summer, they will be periodically changed with new tanks. Specifically, a new 77a tank will come filled with high pressure fluid and a new tank 71a will come empty (tanks are prepared according to FIGS. 15 and 16).

FIG. 7 is a flowchart of a deep cycle heating half loop of the present invention describing the process of FIG. 5. A low pressure storage tank 71a contains a fluid which is drawn through a fluid compressor 81 and then pushed through a condenser. Heat is released in the compression/condenser cycle. Energy must be input into the compressor as input energy 54a. After passing through the condenser, high pressure fluid is stored in the high pressure storage tank 77b. This is a half loop deep cycle system since when in the heating mode, it flows in only one direction.

FIG. 8 is a flowchart of a deep cycle cooling half loop of the present invention it describes the stem of FIG. 6. High pressure fluid is stored in high pressure storage tank 77c. IT flows through an evaporator 79a where it absorbs heat. Note that no energy input is required for this cooling process and no friction heat is generated. The fluid is then stored in a low pressure storage tank 71c. This is a half loop deep cycle system since when in the cooling mode, it flows in only one direction.

FIG. 9 is a map of regions of North American segmented by annual temperature patterns. North America can be divided into three regions. A cold region I 91 where heating is required much of the time and cooling is generally not required. A moderate region II 93 where heating is required in the winter and cooling is required in the summer. A hot region III where heating is generally not required and where cooling is required much of the time.

FIG. 10 is a map of regions of North American with two fluid pipelines serving the east coast. A low pressure pipeline 97 contains a fluid under low pressure and stretches across three zones of North America. A high pressure pipeline 99 contains a fluid under high pressure and stretches across three zones of North America. Pressures in these pipelines are respectively kept within a normal operating pressure range according to passive techniques described in FIGS. 15 and 16 and other active techniques which are well know in the prior art. This dual pipeline technique enables users of building heating in region I to generate heat using the afore described half loop deep cycle technique while users of building cooling in region III absorb heat using the afore described half loop deep cycle technique. This system integrates a vast number of heaters and coolers to create a totally new utility that significantly reduces energy consumption and global warming.

FIG. 11 illustrates a deep cycle fill loop flowchart of the present invention for heating a first building in Region I of FIG. 10 and then cooling a second building in region II of FIG. 10 (wherein both buildings are connect to 97, and 99). At a first location "A" (in a cold region), a half loop heat pump 53a operates by drawing a low pressure fluid from a low pressure storage means 65a. Location "A" energy 54a is input to compress said low pressure fluid. Said compression causes heat energy to be released into a location "A" warm house 55a. Said fluid, once compressed and heat extracted, is stored in a high pressure storage means 57a. Note that at location "A", the fluid is not returned to the low pressure state. A deep cycle system by definition will operate on only half of the prior art refrigeration loop at a time such that in the cold region, only the compression side of the loop operates to release heat for warmth. Note that no heat is drawn from the location "A" cold environment.

At a second location "B" (in a warm region), a half loop air conditioner 61a operates by drawing the high pressure fluid from the high pressure storage means 57a. No energy input is required to expand said high pressure fluid. Said expansion causes heat energy to be absorbed from a location "B" cool house 63a. Said fluid, once expanded and heat absorbed, is stored in the low pressure storage means 65a. Note that at location "B", the fluid is not returned to the high pressure state. A deep cycle system by definition will operate on only half of the prior art refrigeration loop at a time such that in the warm region, only the expansion side of the loop operates to absorb heat for cooling. Note that no heat is released into the location "B" warm environment. Moreover no energy need be input during the location "B" cooling process. Further, no friction heat loss is incurred in this cooling process. It should be noted that 55a and 63a are in different regions as illustrated in FIG. 10.

FIG. 12 shows the components of the present invention in the heating mode of the second embodiment. When operating in the heating mode, a low pressure storage pipe 101 contains a fluid and is connected to the house. Said pipe is connected to 97 of FIG. 10. Said fluid is drawn through a compressor/condenser 73a where it releases heat energy into the house. Said fluid having passed through a low pressure valve 72b. Note that any friction energy is also released into the house since the 73a is in the house. High pressure fluid then flows through a high pressure valve 75b and into a large high pressure storage pipe 103. Said pipe is connected to 99 of FIG. 10. Note that in the heating cycle, the fluid only flows in one direction, from low pressure to high pressure. The system will operate in this manner all winter FIG. 13 shows the components of the present invention in the cooling mode of the second embodiment. When operating in the cooling mode, a high pressure storage pipe 103a contains a fluid. Said pipe is connected to 99 of FIG. 10. Said fluid is pushed by its own pressure through an evaporator 79a where it absorbs heat energy from the house. Said fluid having passed through a pressure valve 75c. Note that no friction heat energy is released since no work need be done. Low pressure fluid then flows through a second pressure valve 72c and into a low pressure storage pipe 101a. Note that in the cooling cycle, the fluid only flows in one direction, from high pressure to low pressure. The system will operate in this manner all summer. Said pipe is connected to 97 of FIG. 10.

FIG. 14 shows a series of houses each connected to a high pressure fluid pipeline and to a low pressure fluid pipeline. Note that high pressure spur 117 is a spur off of 99 of FIG. 10 and low pressure spur 119 is a spur off of 97 of FIG. 10. A first house 111 is connected to the 117 via a first connecting pipe 113 and the 119 via a second connecting pipe 115. The 113 connects to 103 and 103a of FIG. 12 and 13 respectively while the 115 connects to the 101 and 101a of FIGS. 12 and 13 respectively. A second house 121 is similarly connected to 117 and 119 as are a series of houses throughout regions I, II, and III of FIG. 10.

FIG. 15 shows the storage tanks of FIG. 5 and FIG. 6 in cutaway view. A cutaway storage tank 131 is a solid metal sealed container. A floating piston 137 sealably forms two chambers within the 131. A first chamber 133 contains a fluid which is used as a refrigerant. A second chamber 139 is used to contain a second gas which is further described in FIG. 16. The 137 floats back an forth within the tank such that the 133 and 139 are variable in volume. A refrigerant port enables refrigerant to be drawn from or pushed into the 133 as needed. An air vent 141 is used only on the low pressure tanks. It enables air to flow into and out of the 139 such that a relatively constant pressure is maintained in the 133 as the volume of 133 changes. FIG. 16a shows a cross section view of a low pressure and a high pressure tank similar to 131 tanks of FIG. 15 they are 131a and 151a. A compressor draws fluid from a low pressure "a" low tank 131a to compress it, produce heat and store it in a high pressure "a" high tank 151a. This creates a negative pressure differential in 131a such that the floating piston moves to the left and causes air to enter a sealed compartment of the tank. Further, a pressure differential is created within the 151a which causes Hr to push against the 151a floating piston and thereby compresses a compressible inert gas Hi. As this process continues through the winter, The Lr (low pressure refrigerant volume is reduced and its volume displaced with air La, also the High pressure refrigerant Hr increases causing the Hi inert gas to further compress. Thus a desired pressure range is maintained in both 131a and 151a while the volume of gas moves from the former to the later. FIG. 16b shows the process further along. FIG. 16c shows the process complete. When the summer comes, FIG. 16d describes the cooling process. The pressure within the Hr enables its controlled release from the high pressure "d" high tank 151d into the low pressure "d" tank 131d. Hi increases volume in the former while La is expelled from the later. Thus pressure in both the 151a and the 131a are maintained within a desirable range while relative refrigerant volume change in both 151d and 131d. Note that no energy input is required for the summer cooling operation. Compressible gasses such as Hi can also be used to passively regulate the pressure in the pipeline system of FIG. 10.

Conclusion, Ramifications, and Scope

Thus the reader will see that the deep cycle heating and cooling process and apparatus of the present invention provides a novel, unanticipated, highly functional and reliable means for heating and cooling buildings while reducing energy consumption and wasted heat.

While my above description describes many specifications, these should not be construed as limitations on the scope of the invention, but rather as an exemplification of a preferred embodiment thereof. Many other variations are possible. For example other heating and cooling loops are known which can used in conjunction with the art disclosed herein. Carnot refrigeration, vapor-compressor refrigeration, Cascade Refrigeration Systems, and Multi-stage Compression Refrigeration are known in the prior art. It is anticipated that high pressure and low pressure tanks can transported to different regions instead of using pipelines.

It is anticipated that process and apparatus disclosed herein can be used in any process that substantially requires heat production and heat absorption. For example, in a home, the clothes dryer, water heater, and stove can use the deep cycle compression half loop to generate heat and add fluid to the high pressure side of the loop. Similarly, high pressure fluid can be expanded or evaporated in the heat absorption deep cycle side of the half loop. In a home environment, the refrigeration can be hooked into the apparatus and process described herein. While the embodiments described herein are drawn to heating and cooling a home. it will be understood that any commercial process requiring heat and/or heat absorption can use the apparatus and process described herein.

Fluid as used herein can be a gas, a liquid, or any substance that can substantially conform to the shape of its container. Refrigeration and heat pump cycles used herein can operate by compressing a gas to form a liquid (condensation) under pressure and then by lowering the pressure thereby expanding the fluid into a gas (evaporation).

I claim:

1. A process for generating heat which draws in fluid which is at a low pressure, compresses said fluid thereby transforming said fluid to become a high pressure fluid, wherein heat is released in the said transforming, and wherein said high pressure fluid is stored at a high pressure for use in a separate cooling process.

2. A process for absorbing heat which draws in fluid which is at a high pressure, expands said fluid thereby transforming said fluid to become a low pressure fluid, wherein heat is absorbed in the said transforming, and wherein said low pressure fluid is stored at a low pressure for use in a separate heating process.

3. Apparatus for generating heat which includes a low pressure fluid storage means, a fluid compression means which compresses said fluid thereby transforming said fluid to become a high pressure fluid, wherein heat is released in the said transforming, and a high pressure fluid storage means, wherein said high pressure fluid is later used in a separate cooling process.

4. Apparatus for absorbing heat which includes a high pressure fluid storage means, a fluid expansion means which expands said fluid thereby transforming said fluid to become a low pressure fluid, wherein heat is absorbed in the said transforming, and a low pressure fluid storage means, wherein said low pressure fluid is later used in a separate heating process.

* * * * *